US010852796B2

(12) United States Patent
Messick et al.

(10) Patent No.: US 10,852,796 B2
(45) Date of Patent: Dec. 1, 2020

(54) SYSTEM AND METHOD OF MANAGING THROTTLING OF INFORMATION HANDLING SYSTEMS (71) Applicant: Dell Products L.P., Round Rock, TX (US)

(72) Inventors: Douglas Evan Messick, Austin, TX (US); Kyle E. Cross, Austin, TX (US)

(73) Assignee: Dell Products L.P., Round Rock, TX (US)

(*) Notice: Subject to any disclaimer, the term of this patent is extended or adjusted under 35 U.S.C. 154(b) by 177 days.

(21) Appl. No.: 16/167,190

(22) Filed: Oct. 22, 2018

(65) Prior Publication Data

US 2020/0125159 A1    Apr. 23, 2020

(51) Int. Cl.
    *G06F 1/26*     (2006.01)
    *G06F 1/32*     (2019.01)
    *G06F 1/30*     (2006.01)
    *G06F 1/3206*   (2019.01)

(52) U.S. Cl.
    CPC ............. *G06F 1/263* (2013.01); *G06F 1/30* (2013.01); *G06F 1/3206* (2013.01)

(58) Field of Classification Search
    CPC ........... G06F 1/263; G06F 1/30; G06F 1/3206
    See application file for complete search history.

(56) References Cited

U.S. PATENT DOCUMENTS

| 7,295,935 B2 * | 11/2007 | Kasprzak | G06F 1/28 340/500 |
| 7,921,315 B2 * | 4/2011 | Langgood | G06F 1/3203 713/340 |
| 8,201,002 B2 * | 6/2012 | Chang | G06F 1/3203 323/304 |

* cited by examiner

*Primary Examiner* — Stefan Stoynov
(74) *Attorney, Agent, or Firm* — Baker Botts L.L.P.

(57) ABSTRACT

In one or more embodiments, one or more systems, methods, and/or processes may query information handling systems (IHSs) for respective power consumption levels; may determine an amount of power utilized by the IHSs from the power consumption levels; may determine an integer number of power supply units (PSUs) based at least on the amount of power utilized by the IHSs; may determine that a number of operational PSUs changes; may determine that the number of operational PSUs is not at or above a threshold number; may determine if the number of operational PSUs is at or above the integer number of PSUs; if the number of operational PSUs is at or above the integer number of PSUs, may determine that the number of operational PSUs changes; and otherwise, may provide throttle down information to the IHSs.

20 Claims, 7 Drawing Sheets

SYSTEM AND METHOD OF MANAGING THROTTLING OF INFORMATION HANDLING SYSTEMS

BACKGROUND

Field of the Disclosure

This disclosure relates generally to information handling systems and more particularly to throttling of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may query multiple information handling systems, housed in a chassis, for respective power consumption levels; may determine an amount of power utilized by the multiple information handling systems from the power consumption levels respectively associated with the multiple information handling systems; may determine an integer number of power supply units based at least on the amount of power utilized by the multiple information handling systems; may determine that a number of operational power supply units changes; may determine that the number of operational power supply units is not at or above a threshold number; may determine if the number of operational power supply units is at or above the integer number of power supply units; if the number of operational power supply units is at or above the integer number of power supply units, may determine if a chassis bypass is enabled; if the chassis bypass is enabled, may determine that the number of operational power supply units changes; and if the number of operational power supply units is not at or above the integer number of power supply units or if the chassis bypass is not enabled, may provide throttle down information to the multiple information handling systems.

In one or more embodiments, the one or more systems, methods, and/or processes may further determine chassis health status information based at least on at least one of health status information associated with a fan of the chassis, health status information associated with a non-volatile memory medium of the chassis, and health status information associated with a power supply node of the chassis. In one or more embodiments, the one or more systems, methods, and/or processes may further provide the chassis health status information to a logic device. For example the one or more systems may include an enclosure controller. For instance, the enclosure controller may include the logic device. In one or more embodiments, the logic device may be configured to configure the chassis bypass to be enabled or to be not enabled based at least the chassis health status information. In one or more embodiments, the logic device may be configured to determine if the chassis bypass is enabled.

In one or more embodiments, the enclosure controller may be further configured to provide the integer number of power supply units to the logic device. In one or more embodiments, the one or more systems, methods, and/or processes may further periodically: query the multiple information handling systems housed in the chassis for the respective power consumption levels; determine the amount of power utilized by the multiple information handling systems from the power consumption levels respectively associated with the multiple information handling systems; determine the integer number of power supply units based at least on the amount of power utilized by the multiple information handling systems; and provide the integer number of power supply units to the logic device.

In one or more embodiments, the throttle down information may indicate that a processor of each information handling system of the multiple information handling systems is not exceed a clock rate. In one or more embodiments, the power consumption levels respectively associated with the multiple information handling systems may be based at least on peak power consumption levels respectively associated with the multiple information handling systems and based at least on average power consumption levels respectively associated with the multiple information handling systems. In one or more embodiments, the enclosure controller may be further configured to receive configuration information that includes the threshold number.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a chassis may house one or more information handling systems. For example, the chassis may house an enclosure controller (e.g., a chassis management controller, a chassis management module, etc.) that may manage power from power supply units to the one or more information handling systems and/or to one or more other components housed by the chassis. For instance, the one or more other components housed by the chassis may include one or more non-volatile storage devices, one or more input/output modules, and/or one or more fans, among others. In one or more embodiments, the enclosure controller may manage power consumption of the one or more information handling systems and/or of the one or more other components housed by the chassis. For example, managing power consumption of the one or more information handling systems and/or of the one or more other components housed by the chassis may prevent the power supply units from overloading. For instance, the enclosure controller may configure one or more power consumption levels of the one or more information handling systems and/or of the one or more other components housed by the chassis such that the one or more power consumption levels do not overload the power supply units. In one or more embodiments, if a power supply is overloaded, the power supply may cease to function. For example, it may cease to function for a period of time. For instance, the power supply may reset, where the power supply may cease to function for a period of time while the power supply resets.

In one or more embodiments, a number of operational power supply units may drop below a first threshold number of power supply units. In one example, the enclosure controller may throttle (e.g., throttled down) one or more information handling systems in response to the number of operational power supply units dropping below the first threshold number of power supply units. In another example, the enclosure controller may not throttle (e.g., not throttled down) the one or more information handling systems in response to the number of operational power supply units dropping below the first threshold number of power supply units. For instance, even though the number of operational power supply units may drop below the first threshold number of power supply units, a number of remaining operational power supply units may be sufficient to provide power to the one or more information handling systems without throttling (e.g., without throttling down) the one or more information handling systems. In one or more embodiments, throttling down one or more information handling systems may include configuring at least one of the one or more information handling systems to consume less power. In one or more embodiments, throttling down one or more information handling systems may include configuring at least one of the one or more information handling systems to process less information within a time period. For example, reducing a clock speed of at least one processor of at least one of the one or more information handling systems may cause the at least one of the one or more information handling systems to process less information within a time period.

In one or more embodiments, the one or more information handling systems and/or the one or more other components housed by the chassis may consume less power than provided by the number of remaining operational power supply units. For example, it may be determined that the number of remaining operational power supply units are sufficient to provide power to the one or more information handling systems and/or to the one or more other components housed by the chassis without throttling (e.g., without throttling down) the one or more information handling systems and/or the one or more other components housed by the chassis based at least on power consumption associated with the one or more information handling systems and/or based at least on power consumption associated with the one or more other components housed by the chassis.

In one or more embodiments, an amount of power utilized by the chassis may be determined. In one example, the amount of power utilized by the chassis may include power utilized by the one or more information handling systems of the chassis. In another example, the amount of power utilized by the chassis may include power utilized by the one or more other components housed by the chassis. In one or more embodiments, a second threshold number of power supply units may be determined based at least on the amount of power utilized by the chassis. For example, the second threshold number of power supply units may provide at least as much power as the amount of power utilized by the chassis. In one or more embodiments, even though the number of operational power supply units may drop below the first threshold number of power supply units, the number of remaining operational power supply units may be at or above the second threshold number of power supply units. For example, if the number of remaining operational power supply units is at or above the second threshold number of power supply units, the one or more information handling systems and/or the one or more other components housed by the chassis may not be throttled (e.g., not throttled down). For instance, throttling (e.g., throttling down) the one or more information handling systems and/or the one or more other components housed by the chassis may include reducing power consumed by the one or more information handling systems and/or the one or more other components housed by the chassis.

In one or more embodiments, a chassis bypass may be configured to direct utilizing the number of operational power supply units that are at or above the second threshold. In one example, if chassis bypass is configured to enable utilizing the number of operational power supply units that are at or above the second threshold, information handling systems of the chassis may not be throttled (e.g., not throttled down). In another example, if chassis bypass is not configured to enable utilizing the number of operational power supply units that are at or above the second threshold, information handling systems of the chassis may be throttled (e.g., throttled down). In one or more embodiments, there may be a chassis issue that may cause a bypass of not throttling down. For example, the chassis issue may be associated with one or more criteria. For instance, the one or more criteria may include one or more of the integer number of operational power supply units equaling an absolute minimum number of operational power supply units, an ambient temperature of the chassis meeting or exceeding a maximum temperature, a pulse width modulation of one or more fans meeting or exceeding a maximum pulse width modulation, meeting or exceeding a predetermined or a preset ratio of an information handling system power consumption to an infrastructure power consumption, a loss of a "heartbeat" from a component of the chassis, a health status of a power management unit, and any fault behavior, among others.

In one or more embodiments, an amount of power utilized by the chassis may be determined multiple times. For example, an amount of power utilized by the chassis may be determined periodically. In one instance, a frequency of determining an amount of power utilized by the chassis may appear that the amount of power utilized by the chassis may be determined continuously. In another instance, a frequency of determining an amount of power utilized by the chassis may appear that the amount of power utilized by the chassis may be determined in "real time". In one or more embodiments, peak power consumption and/or average power consumption may be determined. For example, an enclosure controller may determine peak power consumption and/or average power consumption of the one or more information handling systems and/or of the one or more other components housed by the chassis. In one or more embodiments, peak power consumption and/or average power consumption may be determined multiple times. For example, peak power consumption and/or average power consumption may be determined periodically. In one instance, a frequency of determining peak power consumption and/or average power consumption may appear that peak power consumption and/or average power consumption may be determined continuously. In another instance, a frequency of determining peak power consumption and/or average power consumption may appear that peak power consumption and/or average power consumption may be determined in "real time". In one or more embodiments, a power management unit of the enclosure controller may determine peak power consumption and/or average power consumption of the one or more information handling systems and/or of the one or more other components housed by the chassis. In one or more embodiments, the power management unit of the enclosure controller may be referred to as a co-processor of the enclosure controller.

In one or more embodiments, the power management unit may acquire power consumption data associated with the chassis. For example, the power management unit may determine a minimum number of power supply units that are sufficient to provide power based at least on the peak power consumption and/or the average power consumption of the one or more information handling systems and/or of the one or more other components housed by the chassis. In one or more embodiments, the power management unit may provide the minimum number of power supply units that are sufficient to provide power to a fault tolerant redundancy device. For example, a fault tolerant redundancy device may determine a number of power supply units that are available to provide power to the one or more information handling systems and/or to the one or more other components housed by the chassis. In one or more embodiments, the fault tolerant redundancy device may determine if a number of power supply units that are available to provide power to the one or more information handling systems and/or to the one or more other components housed by the chassis falls below a minimum number of power supply units that are sufficient to provide power. For example, if the number of power supply units that are available to provide the power to the one or more information handling systems and/or to the one or more other components housed by the chassis falls below the minimum number of power supply units that are sufficient to provide the power, the fault tolerant redundancy device may throttle (e.g., throttle down) one or more of the information handling systems of the chassis and/or one or more other components of the chassis.

Figure 1:
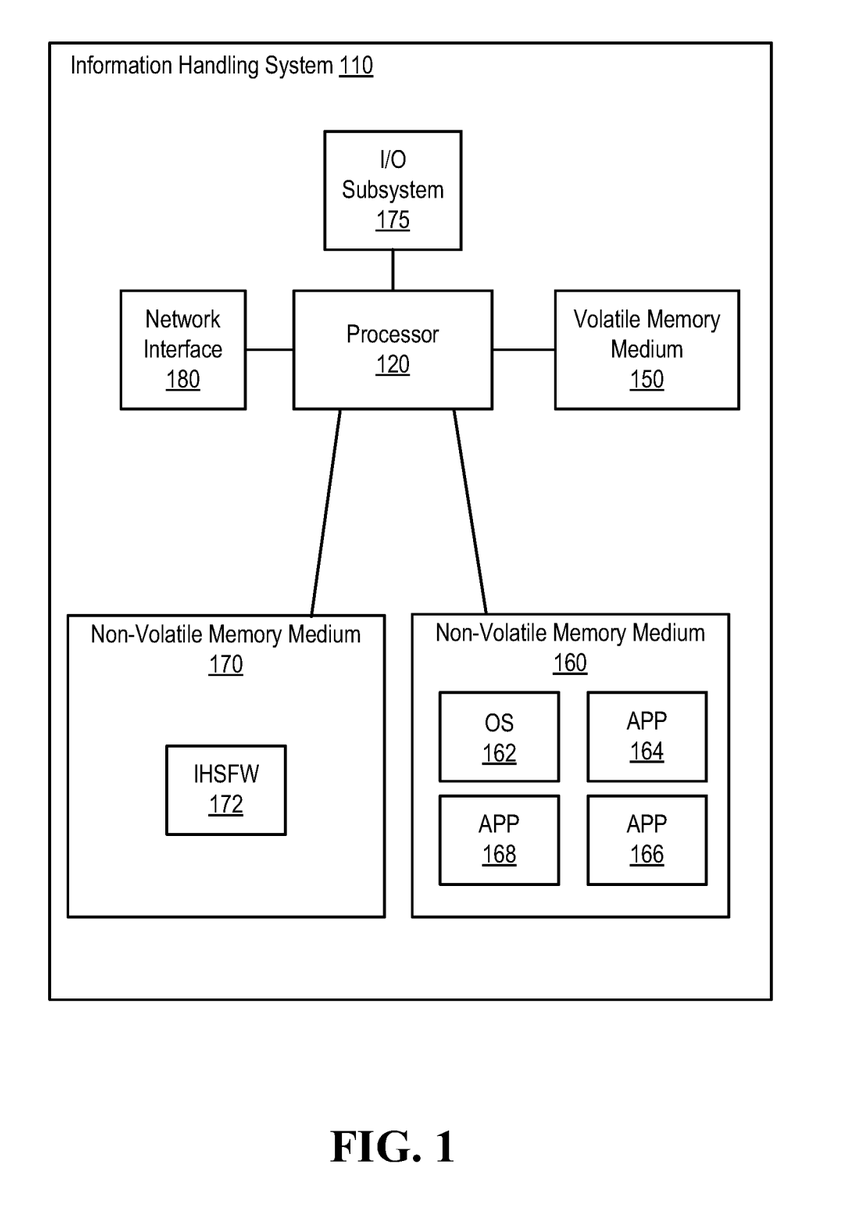
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
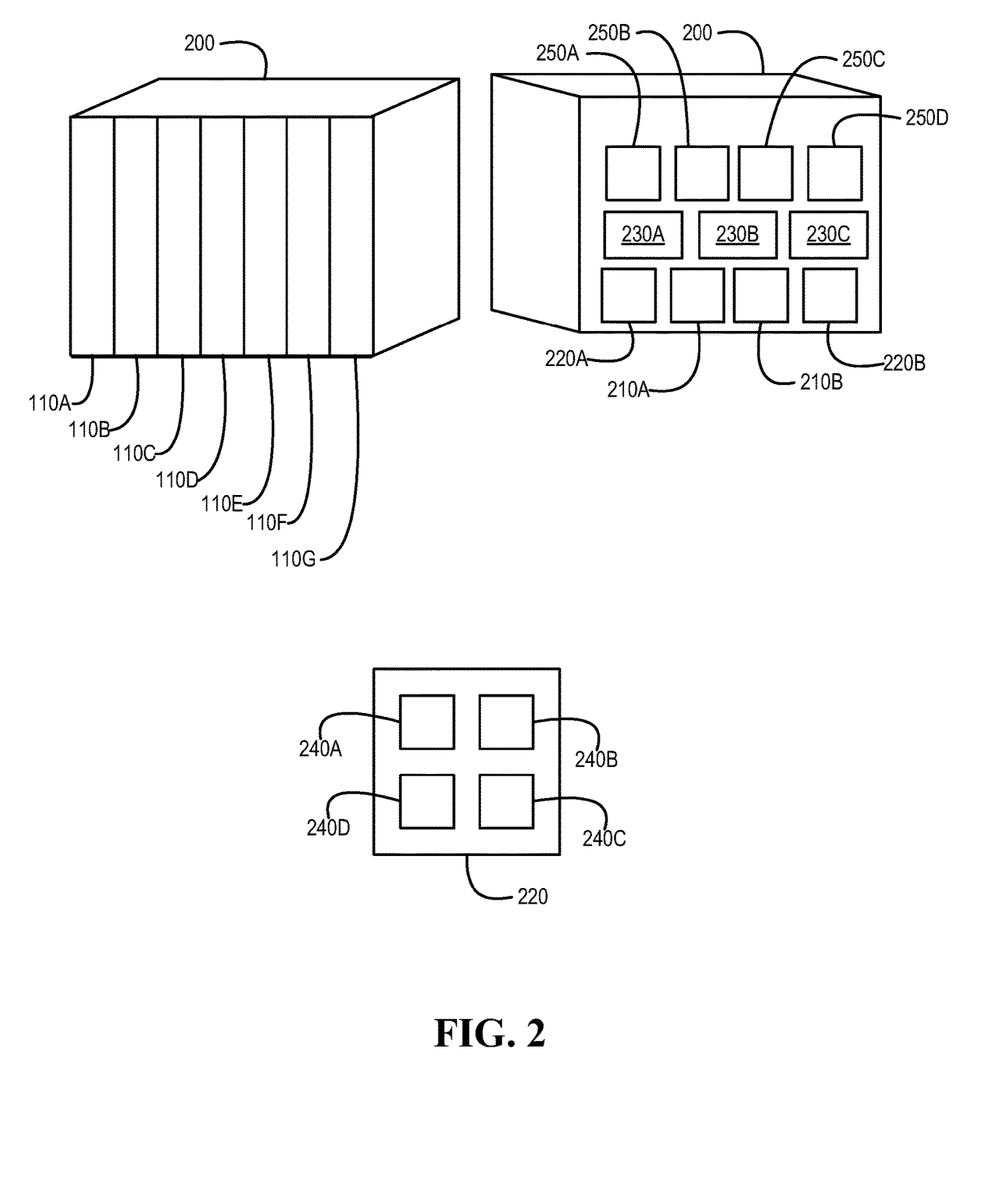
FIG. 2 illustrates an example of an information handling system chassis, according to one or more embodiments.

Turning now to FIG. 2, an example of an information handling system chassis is illustrated, according to one or more embodiments. As shown, an information handling system chassis 200 may include and/or may be configured to include multiple information handling systems (IHSs). In one or more embodiments, chassis 200 may be or include an enclosure that may be configured to include IHSs. For example, chassis 200 may include and/or may be configured to include IHSs 110A-110G. For instance, one or more of IHSs 110A-110G may be removable. In one or more embodiments, a first IHS 110 may be swapped for a second IHS 110, different from the first IHS 110.

In one or more embodiments, chassis 200 may include one or more enclosure controllers. As illustrated, chassis 200 may include enclosure controllers (ECs) 210A and 210B. In one or more embodiments, an enclosure controller (EC) 210 may be or include a chassis management controller (CMC). In one or more embodiments, an enclosure controller (EC) 210 may be or include a chassis management module (CMM). For example, an EC 210 may manage one or more components of chassis 200. In one or more embodiments, chassis 200 may include one or more power supply nodes (PSNs). As shown, chassis 200 may include PSNs 220A and 220B. In one or more embodiments, a power supply node (PSN) 220 may include one or more power supply units (PSUs) 240. For example, a PSN 220 may include multiple power PSUs 240A-240D. For instance, if one of the multiple PSUs is associated with an issue, PSN 220 may continue to provide power to chassis 200 via one or more other PSUs. In one or more embodiments, one or more of PSNs 220A and 220B may be removable. For example, a first PSN 220 may be swapped for a second PSN 220, different from the first PSN 220. In one instance, the first PSN 220 may be swapped for the second PSN 220 without ceasing operations of one or more of IHSs 110A-110G. In one instance, the first PSN 220 may be swapped for the second PSN 220 without throttling down one or more of IHSs 110A-110G. In one or more embodiments, one or more of ECs 210A and 210B may be removable. For example, a first EC 210 may be swapped for a second EC 210, different from the first EC 210. For instance, the first EC 210 may be swapped for the second EC 210 without ceasing operations of one or more of IHSs 110A-110G.

In one or more embodiments, chassis 200 may include one or more fans. For example, the one or more fans may provide airflow through various one or more portions of chassis 200. For instance, the airflow through various one or more portions of chassis 200 may remove heat from one or more portions of chassis 200 and/or one or more portions of one or more IHSs 110. As illustrated, chassis 200 may include fans 230A-230C. In one or more embodiments, an EC 210 may monitor one or more fans 230, one or more temperatures of one or more portions of chassis 200, one or more PSUs 240, and/or one or more PSNs 220, among others. In one or more embodiments, EC 210 may control one or more portions and/or one or more components of chassis 200. In one or more embodiments, EC 210 may include one or more structures and/or one or more functionalities as those described with reference to IHS 110. In one or more embodiments, EC 210 may be configured, coded, and/or encoded with instructions in accordance with at least a portion of one or more of systems, flowcharts, methods, and/or processes described herein.

In one or more embodiments, chassis 200 may include one or more non-volatile memory media. For example, chassis 200 may include non-volatile memory media 250A-250D. In one or more embodiments, a non-volatile memory medium 250 may include one or more structures and/or one or more functionalities as those described with reference to non-volatile memory medium 160. In one or more embodiments, one or more of non-volatile memory media 250A-250D may provide storage for one or more of IHSs 110A-110G.

Figure 3:
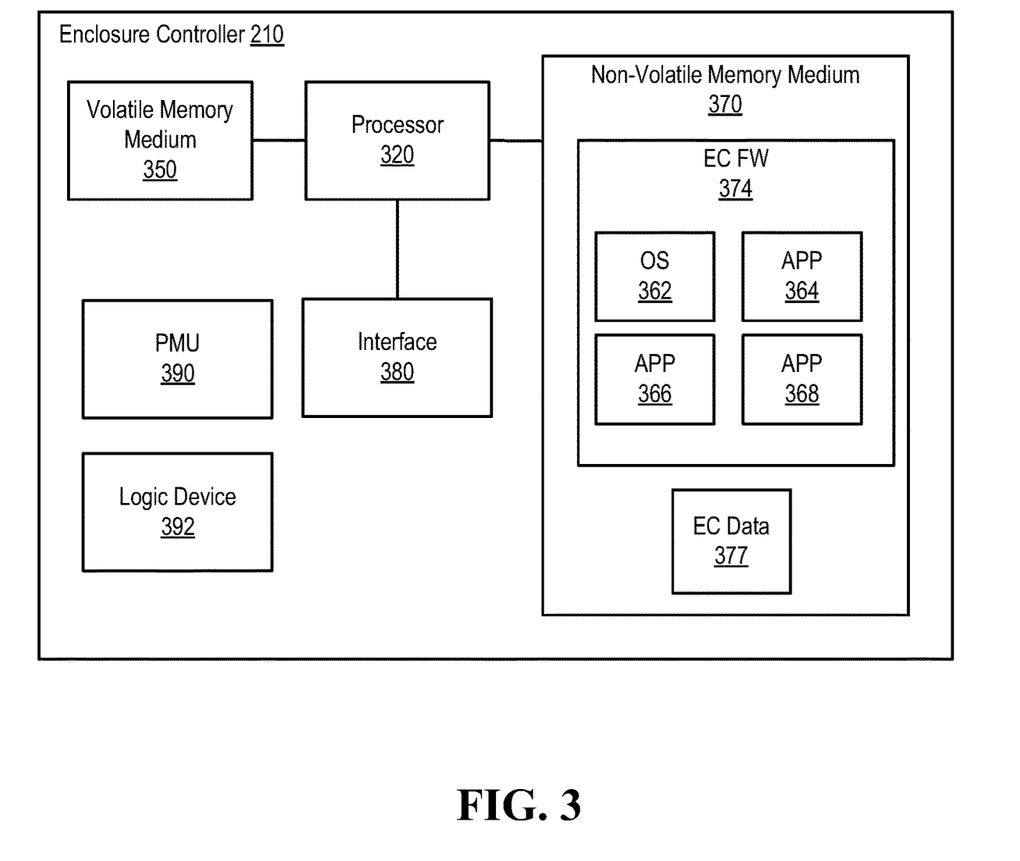
FIG. 3 illustrates an example enclosure controller, according to one or more embodiments.

Turning now to FIG. 3, an example enclosure controller is illustrated, according to one or more embodiments. As shown, EC 210 may include a processor 320, a volatile memory medium 350, a non-volatile memory medium 370, and an interface 380. As illustrated, non-volatile memory medium 370 may include an EC firmware (FW) 374, which may include an OS 362 and APPs 364-368, and may include EC data 377. In one example, OS 362 may be or include a real-time operating system (RTOS). In another example, OS 362 may be or include an Unix-like operating system. As shown, EC 210 may include a power management unit (PMU) 390. In one or more embodiments, PMU 390 may be configured, coded, and/or encoded in accordance with at least a portion of one or more of systems, flowcharts, methods, and/or processes described herein. In one or more embodiments, PMU 390 may be or include a field programmable gate array (FPGA). In one or more embodiments, PMU 390 may be or include a complex logic device (CPLD). For example, a CPLD may include one or more structures and/or functionalities of a FPGA and/or one or more structures and/or functionalities of a programmable array logic (PAL), among others. In one or more embodiments, PMU 390 may be or include an ASIC. As illustrated, EC 210 may include a logic device 392. In one or more embodiments, logic device 392 may be or include a FPGA. In one or more embodiments, logic device 392 may be or include a CPLD. For example, a CPLD may include one or more structures and/or functionalities of a FPGA and/or one or more structures and/or functionalities of a PAL, among others. In one or more embodiments, logic device 392 may be or include an ASIC. In one or more embodiments, logic device 392 may be configured, coded, and/or encoded in accordance with at least a portion of one or more of systems, flowcharts, methods, and/or processes described herein. In one or more embodiments, logic device 392 may be or include a fault tolerant redundancy device.

In one or more embodiments, interface 380 may include circuitry that enables communicatively coupling to one or more devices. In one example, interface 380 may include circuitry that enables communicatively coupling to one or more buses. In a second example, interface 380 may include circuitry that enables one or more interrupt signals to be received. In one instance, interface 380 may include general purpose input/output (GPIO) circuitry, and the GPIO circuitry may enable one or more interrupt signals to be received and/or provided via at least one interrupt line. In another instance, interface 380 may include GPIO circuitry that may enable EC 210 to provide and/or receive signals associated with other circuitry (e.g., diagnostic circuitry, etc.). In a third example, interface 380 may include circuitry that enables communicatively coupling to one or more networks. In one instance, interface 380 may include circuitry that enables communicatively coupling to network interface 180. In another example, interface 380 may include a network interface.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with one or more of systems, flowcharts, methods, and/or processes described herein. For example, non-volatile memory medium 370 and/or volatile memory medium 360 may store instructions that may be executable in accordance with one or more of systems, flowcharts, methods, and/or processes described herein. In one or more embodiments, processor 320 may execute instructions in accordance with at least a portion of one or more of systems, flowcharts, methods, and/or processes described herein. For example, non-volatile memory medium 370 and/or volatile memory medium 360 may store instructions that may be executable in accordance with at least a portion of one or more of systems, flowcharts, methods, and/or processes described herein. In one or more embodiments, processor 320 may utilize EC data 377. In one example, processor 320 may utilize EC data 377 via non-volatile memory medium 370. In another example, one or more portions of EC data 377 may be transferred to volatile memory medium 350, and processor 320 may utilize EC data 377 via volatile memory medium 350.

In one or more embodiments, EC 210 may be or include a remote access controller. For example, the remote access controller may be or include a Dell Remote Access Controller (DRAC). In one or more embodiments, a remote access controller may be integrated into IHS 110 or chassis 200. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110 or chassis 210. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

Figure 4A:
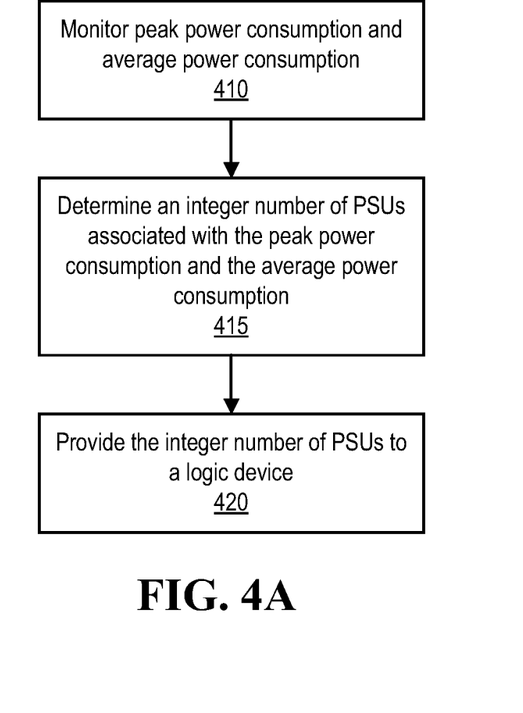
FIG. 4A illustrates an example of a method of operating an enclosure controller, according to one or more embodiments.

Turning now to FIG. 4A, an example of a method of operating an enclosure controller is illustrated, according to one or more embodiments. At 410, peak power consumption and average power consumption may be monitored. For example, PMU 390 may monitor peak power consumption and average power consumption. At 415, an integer number of PSUs associated with the peak power consumption and the average power consumption may be determined. For example, PMU 390 may determine an integer number of PSUs associated with the peak power consumption and the average power consumption. In one or more embodiments, the integer number of PSUs associated with the peak power consumption and the average power consumption may be a number of PSUs that are sufficient to provide the peak power consumption and the average power consumption. At 420, the integer number of PSUs may be provided to a logic device. For example, PMU 390 may provide the integer number of PSUs to logic device 392. In one or more embodiments, the method illustrated in FIG. 4A may be performed periodically. For example, the method illustrated in FIG. 4A may be performed every twenty milliseconds.

Figure 4B:
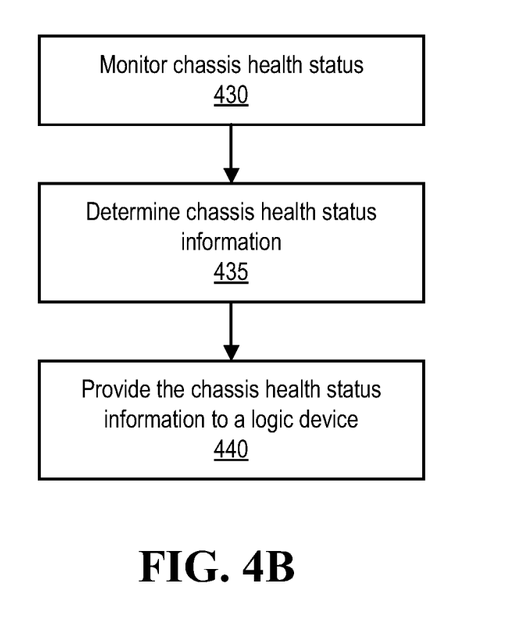
FIG. 4B illustrates an example of another method of operating an enclosure controller, according to one or more embodiments.

Turning now to FIG. 4B, an example of another method of operating an enclosure controller is illustrated, according to one or more embodiments. At 430, chassis health status may be monitored. For example, EC 210 may monitor a health status of chassis 200. In one or more embodiments, monitoring a health status of chassis 200 may include monitoring a health status of one or more fans 230A-230C of chassis 200, a health status of one or more PSUs 240 of chassis 200, a health status of one or more one or more PSNs 220 of chassis 200, a health status of one or more one or more non-volatile memory media 250A-250D of chassis 200, and/or a health status of one or more one or more IHSs 110 of chassis 200, among others. In one or more embodiments, monitoring a health status of chassis 200 may include querying each component of one or more components of chassis 200 for at least one status attribute associated with the component.

At 435, chassis health status information may be determined. For example, EC 210 may determine chassis health status information. In one or more embodiments, chassis health status information may be determined based at least on the chassis health status. For EC 210 may determine chassis health status information based at least on the chassis health status. In one or more embodiments, determining chassis health status information may include determining information to provide to a register of a logic device. For example, EC 210 may determine information to provide to a register of logic device 392. For instance, EC 210 may determine, based at least on the chassis health status, information to provide to a register of logic device 392. In one or more embodiments, the information to provide to the logic device may include one or more bits. In one or more embodiments, the chassis health status information may be or include a vitality measurement of chassis 200. For example, the vitality measurement of chassis 200 may be determined based at least on the at least one status attribute associated with each component of the one or more components of chassis 200.

At 440, the chassis health status information may be provided to a logic device. For example, EC 210 may provide the chassis health status information to logic device 392. For instance, EC 210 may provide the chassis health status information to a register of logic device 392. In one or more embodiments, EC 210 may provide one or more bits that represent the chassis health status information to a register of logic device 392. In one or more embodiments, the method illustrated in FIG. 4B may be performed periodically. For example, the method illustrated in FIG. 4B may be performed every twenty milliseconds.

Figure 5:
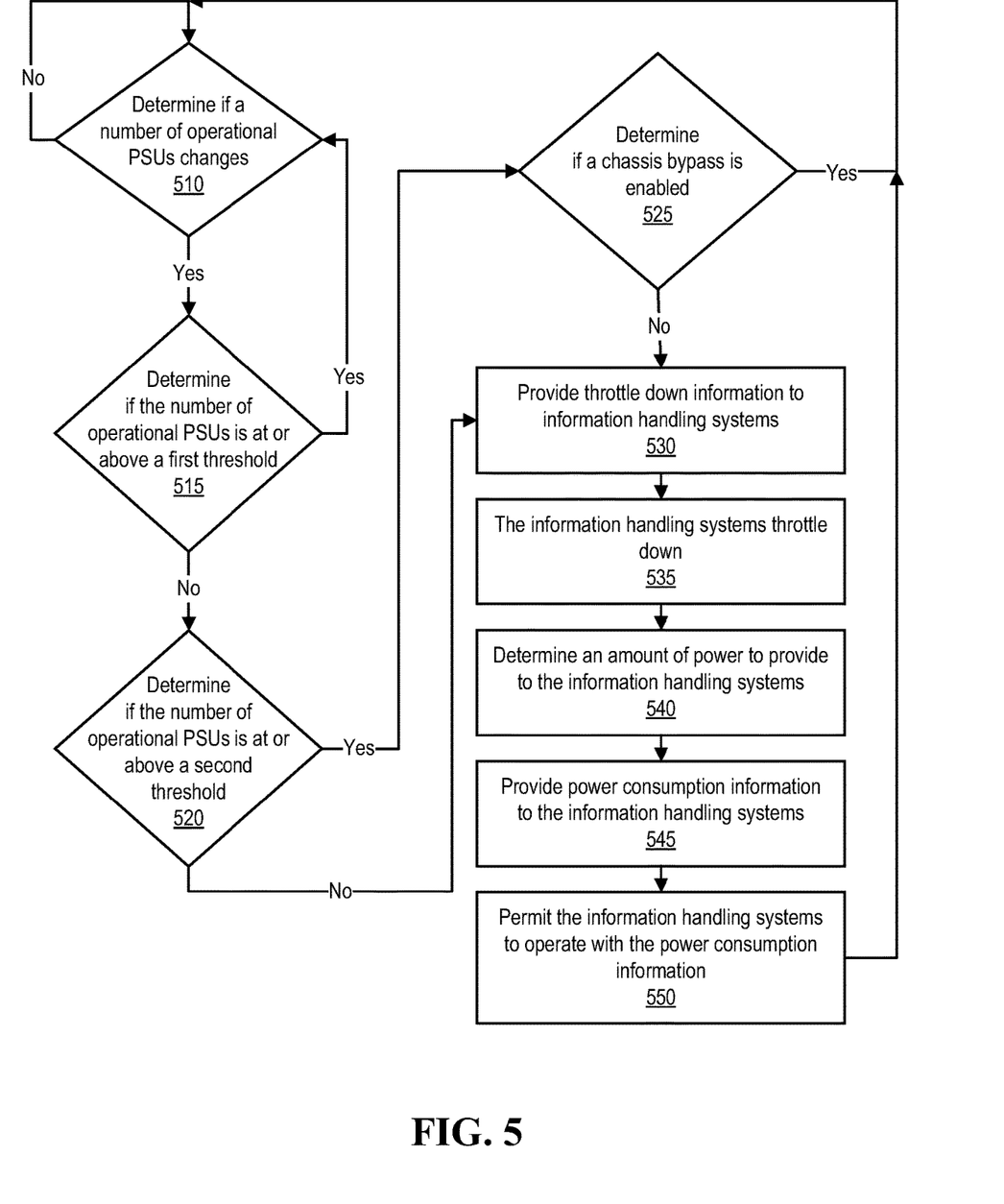
FIG. 5 illustrates an example of a method of operating a chassis, according to one or more embodiments.

Turning now to FIG. 5, an example of a method of operating a chassis is illustrated, according to one or more embodiments. At 510, it may be determined if a number of operational PSUs changes. For example, EC 210 may determine if a number of operational PSUs changes. For instance, logic device 392 may determine if a number of operational PSUs changes. In one or more embodiments, it may be determined that a number of operational PSUs has increased. In one or more embodiments, it may be determined that a number of operational PSUs has decreased. If the number of operational PSUs does not change, the method may proceed to 510, according to one or more embodiments.

If the number of operational PSUs changes, it may be determined if the number of operational PSUs is at or above a first threshold, at 515. For example, EC 210 may determine if the number of operational PSUs is at or above a first threshold. For instance, logic device 392 may determine if the number of operational PSUs is at or above a first threshold.

In one or more embodiments, the first threshold may be configured. For example, the first threshold may be configured via EC 210. For instance, the first threshold may be configured based at least on user input (e.g., administrator input). In one or more embodiments, the first threshold may be determined based at least on installed chassis components and/or power budgeting calculations performed by EC 210. In one or more embodiments, the first threshold may be configured based at least on configuration of IHS 110 and/or chassis 200. For example, the first threshold may be determined by EC 210 based at least on configuration information associated with IHS 110 and/or chassis 200. In one instance, the configuration information associated with IHS 110 and/or chassis 200 may include information associated with how one or more of IHS 110 and chassis 200 are configured. In another instance, the configuration information associated with IHS 110 and/or chassis 200 may include information associated with one or more components that are installed in one or more of IHS 110 and chassis 200.

If the number of operational PSUs is at or above the first threshold, the method may proceed to 510, according to one or more embodiments. If the number of operational PSUs is not at or above the first threshold, it may be determined if the number of operational PSUs is at or above a second threshold, at 520. In one or more embodiments, the second threshold may be the integer number of PSUs associated with the peak power consumption and the average power consumption. For example, PMU 390 may determine the second threshold. For instance, PMU 390 may determine the second threshold at 415, illustrated in FIG. 4A. In one or more embodiments, EC 210 may determine if the number of operational PSUs is at or above the second threshold. For example, logic device 392 may determine if the number of operational PSUs is at or above the second threshold. For instance, PMU 390 may provided the second threshold to logic device 392 at 420, illustrated in FIG. 4A.

If the number of operational PSUs is not at or above the second threshold, the method may proceed to 530, according to one or more embodiments. If the number of operational PSUs is at or above the second threshold, it may be determined if a chassis bypass is enabled, at 525. In one or more embodiments, a chassis bypass may be configured to direct utilizing the number of operational PSUs that are at or above the second threshold. In one example, if chassis bypass is configured to enable utilizing the number of operational PSUs that are at or above the second threshold, information handling systems of the chassis may not be throttled (e.g., not throttled down). In another example, if chassis bypass is not configured to enable utilizing the number of operational PSUs that are at or above the second threshold, information handling systems of the chassis may be throttled (e.g., throttled down). In one or more embodiments, there may be a chassis issue that may cause a bypass of not throttling down. For example, the chassis issue may be associated with one or more criteria. For instance, the one or more criteria may include one or more of the integer number of operational PSUs equaling an absolute minimum number of operational PSUs, an ambient temperature of chassis 200 meeting or exceeding a maximum temperature, a pulse width modulation (PWM) of one or more fans 230A-230C meeting or exceeding a maximum PWM, meeting or exceeding a predetermined or a preset ratio of an information handling system power consumption to an infrastructure power consumption, a loss of a "heartbeat" from a component of chassis 200, a health status of PMU 390, and any fault behavior, among others.

In one or more embodiments, the chassis bypass may be enabled or may not be enabled based at least on chassis health status information. For example, the chassis health status information may have been determined at 435, illustrated in FIG. 4B. For instance, the chassis health status information may be based at least on a health status of one or more fans 230A-230C of chassis 200, a health status of one or more PSUs 240 of chassis 200, a health status of one or more one or more PSNs 220 of chassis 200, a health status of one or more non-volatile memory media 250A-250D of chassis 200, and/or a health status of one or more one or more IHSs 110 of chassis 200, among others. In one example, the chassis bypass may be enabled or may not be enabled based at least on health status information associated with one or more fans 230A-230C. For instance, the health status information associated with one or more fans 230A-230C may indicate that one or more fans 230A-230C may be operating at or above a percentage utilization (e.g., at or above seventy percent (70%) utilization, at or above eighty percent (80%) utilization, at or above ninety percent (90%) utilization, etc.). In a second example, the chassis bypass may be enabled or may not be enabled based at least on an ambient temperature of chassis 200. For instance, the chassis bypass may not be enabled based at least on an ambient temperature of chassis 200 being above a temperature. In a third example, the chassis bypass may be enabled or may not be enabled based at least on health status information associated with one or more non-volatile memory media 250A-250D. In another example, the chassis bypass may be enabled or may not be enabled based at least on health status information associated with one or more power supply nodes 220A and 220B.

If the chassis bypass is enabled, the method may proceed to 510, according to one or more embodiments. If the chassis bypass is not enabled, throttle down information may be provided to the information handling systems, at 530. For example, EC 210 may provide throttle down information to IHSs 110A-110G. For instance, logic device 392 may provide throttle down information to IHSs 110A-110G. At 535, the information handling systems may throttle down. For example, IHSs 110A-110G may throttle down. In one or more embodiments, throttling down an information handling system may include reducing power consumed by the information handling system. For example, reducing power consumed by the information handling system may include reducing a clock rate of a processor of the information handling system.

At 540, an amount of power to provide to the information handling systems may be determined. For example, EC 210 may determine an amount of power to provide to IHSs 110A-110G. For instance, PMU 390 may determine an amount of power to provide to IHSs 110A-110G. In one or more embodiments, determining an amount of power to provide to the information handling systems may be based at least on a number of operational PSUs.

At 545, power consumption information may be provided to the information handling systems. For example, EC 210 may provide power consumption information to IHSs 110A-110G. For instance, PMU 390 may provide power consumption information to IHSs 110A-110G. In one or more embodiments, the power consumption information may be based at least on the amount of power to provide to the information handling systems. In one or more embodiments, the power consumption information provided to the information handling systems may include power limit information. For example, the power limit information may indicate a maximum amount of power that an information handling system may utilize. In one or more embodiments, the maximum amount of power that an information handling system may utilize may be less than an amount of power that the information handling system may have utilized before the information handling system had throttled down. For example, the information handling system may have throttled down its power utilization to a safe and/or a fail-safe power consumption level at 535. For instance, the power consumption information may indicate a power utilization level above the safe and/or the fail-safe power consumption level.

At 550, the information handling systems may be permitted to operate in accordance with the power consumption information. For example, EC 210 may permit IHSs 110A-110G to operate in accordance with the power consumption information. For instance, PMU 390 may permit IHSs 110A-110G to operate in accordance with the power consumption information. In one or more embodiments, permitting the information handling systems to operate with the power consumption information may include de-asserting a flag. For example, a logic device (e.g., a CPLD, a FPGA, etc.) of an information handling system may de-assert a flag, which may permit the information handling system to operate in accordance with the power consumption information. In one or more embodiments, the logic device of the information handling system may determine that the flag may be de-asserted. For example, the logic device of the information handling system may determine that the flag may be de-asserted multiple times. For instance, the logic device of the information handling system may determine that the flag may be de-asserted ten times before de-asserting the flag, which may permit the information handling system to operate in accordance with the power consumption information.

In one or more embodiments, a maximum amount of power that the information handling system may utilize may be associated with a maximum clock speed of a processor of the information handling system. For example, the processor of the information handling system may be configured to utilize a clock speed that does not exceed the maximum clock speed. In this fashion, the information handling system may be throttled down, according to one or more embodiments. For example, the processor of the information handling system may be throttled down. For instance, the maximum clock speed, which may not be exceeded, may be a slower clock speed than a clock speed that the processor was utilizing before the information handling system received the power consumption information and/or the throttle down information.

Figure 6A:
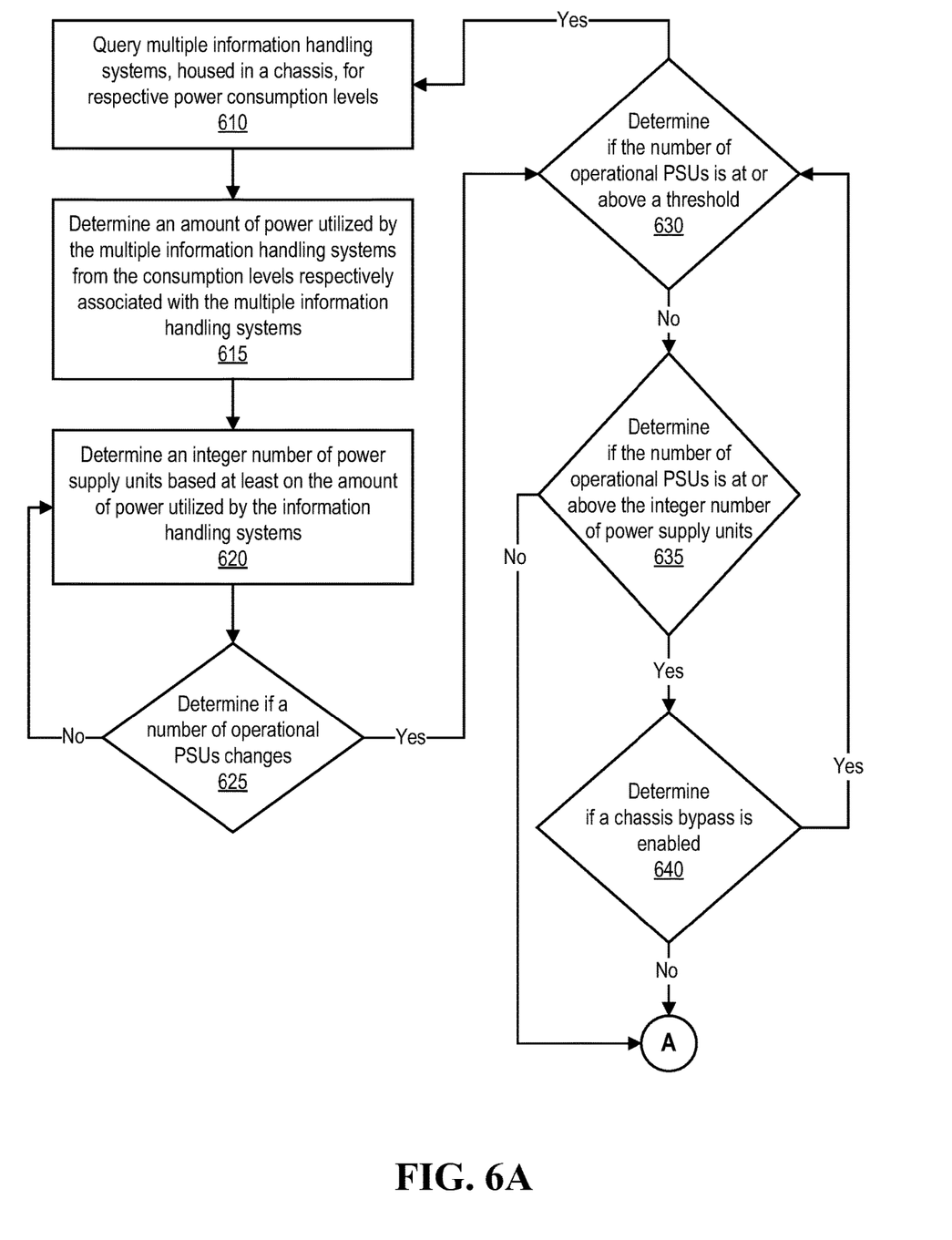
FIGS. 6A and 6B illustrate an example of another method of operating a chassis is illustrated, according to one or more embodiments.
Figure 6B:
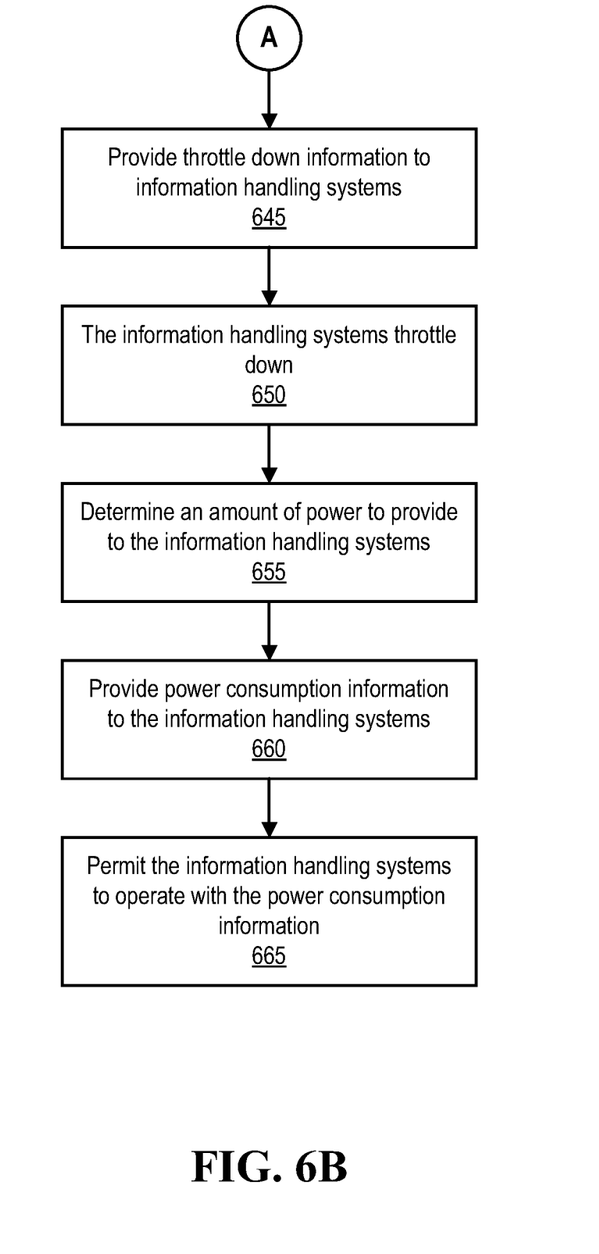

Turning now to FIGS. 6A and 6B, an example of another method of operating a chassis is illustrated, according to one or more embodiments. At 610, multiple information handling systems, housed in a chassis, may be queried for respective power consumption levels. For example, EC 210 may query IHSs 110A-110G for respective power consumption levels. For instance, PMU 390 may query IHSs 110A-110G for respective power consumption levels.

At 615, an amount of power utilized by the multiple information handling systems from the consumption levels respectively associated with the multiple information handling systems may be determined. For example, EC 210 may determine an amount of power utilized by IHSs 110A-110G from the consumption levels respectively associated with IHSs 110A-110G. For instance, PMU 390 may determine an amount of power utilized by IHSs 110A-110G from the consumption levels respectively associated with IHSs 110A-110G.

At 620, an integer number of power supply units based at least on the amount of power utilized by the information handling systems may be determined. For example, EC 210 may determine an integer number of power supply units based at least on the amount of power utilized by IHSs 110A-110G. For instance, PMU 390 may determine an integer number of power supply units based at least on the amount of power utilized by IHSs 110A-110G. In one or more embodiments, the integer number of power supply units may be a number of power supply units that may be sufficient to provide power to the information handling systems housed by the chassis. For example, the integer number of power supply units may be a number of power supply units that may be sufficient to provide power to IHSs 110A-110G housed by chassis 200.

In one or more embodiments, determining the integer number of power supply units based at least on the amount of power utilized by the information handling systems may be further based at least on an amount of power utilized by components of the chassis. For example, the components of the chassis may include one or more fans, one or more I/O modules, one or more non-volatile storage media, and/or one or more enclosure controllers, among others. For instance, components of chassis 200 may include one or more fans 230A-230C, one or more non-volatile storage media 250A-250D, and/or one or more enclosure controllers 210A and 210B, among others.

At 625, it may be determined if a number of operational power supply units changes. For example, EC 210 may determine if a number of operational power supply units changes. For instance, logic device 392 may determine if a number of operational power supply units changes. If the number of operational power supply units does not change, the method may proceed to 620, according to one or more embodiments. If the number of operational power supply units changes, it may be determined if the number of operational power supply units is at or above a threshold number, at 630. For example, EC 210 may determine if the number of operational power supply units is at or above a threshold number. For instance, logic device 392 may determine if the number of operational power supply units is at or above a threshold number. In one or more embodiments, the threshold number may be configured. For example, an administrator (e.g., a user) may configure the threshold number. For instance, an administrator (e.g., a user) may configure the threshold number via EC 210.

If the number of operational power supply units is at or above the threshold number, the method may proceed to 610, according to one or more embodiments. If the number of operational power supply units is not at or above the threshold number, it may be determined if the number of operational power supply units is at or above the integer number of power supply units, at 635. If the number of operational power supply units is at or above the integer number of power supply units, it may be determined if a chassis bypass is enabled, at 640. If the chassis bypass is enabled, it may be determined if the number of operational power supply units changes, at 630. If the chassis bypass is not enabled, throttle down information to the information handling systems, at 645. If the number of operational power supply units is not at or above the integer number of power supply units, throttle down information to the information handling systems, at 645. In one or more embodiments, method elements 645-665 may be performed in accordance with method elements 530-550, respectively.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a chassis configured to house a plurality of components, that includes a plurality of information handling systems, and a plurality of power supplies; and
   an enclosure controller that is coupled to the plurality of components and that is configured to:
   query the plurality of information handling systems for respective power consumption levels;
   determine an amount of power utilized by the plurality of information handling systems from the power consumption levels respectively associated with the plurality of information handling systems;
   determine an integer number of power supply units based at least on the amount of power utilized by the plurality of information handling systems;
   determine that a number of operational power supply units changes;
   determine that the number of operational power supply units is not at or above a threshold number;
   determine when the number of operational power supply units is at or above the integer number of power supply units;
   when the number of operational power supply units is at or above the integer number of power supply units, determine when a chassis bypass is enabled;
   when the chassis bypass is enabled, determine that the number of operational power supply units changes; and
   when the number of operational power supply units is not at or above the integer number of power supply units or when the chassis bypass is not enabled, provide throttle down information to the plurality of information handling systems.

2. The system of claim 1,
   wherein the enclosure controller includes a logic device;
   wherein the enclosure controller is further configured to:
   determine chassis health status information based at least on at least one of health status information associated with a fan of the chassis, health status information associated with a non-volatile memory medium of the chassis, and health status information associated with a power supply node of the chassis; and
   provide the chassis health status information to the logic device;
   wherein the logic device is configured to configure the chassis bypass to be enabled or to be not enabled based at least on the chassis health status information; and
   wherein, to determine when the chassis bypass is enabled, the logic device is configured to determine when the chassis bypass is enabled.

3. The system of claim 1,
   wherein the enclosure controller includes a logic device;
   wherein the enclosure controller is further configured to provide the integer number of power supply units to the logic device;
   wherein, to determine when the number of operational power supply units is at or above the integer number of power supply units, the logic device is configured to determine when the number of operational power supply units is at or above the integer number of power supply units; and wherein, to determine that the number of operational power supply units changes, the logic device is configured to determine that the number of operational power supply units changes.

4. The system of claim 3, wherein the enclosure controller is further configured to periodically:
query the plurality of information handling systems housed in the chassis for the respective power consumption levels;
determine the amount of power utilized by the plurality of information handling systems from the power consumption levels respectively associated with the plurality of information handling systems;
determine the integer number of power supply units based at least on the amount of power utilized by the plurality of information handling systems; and
provide the integer number of power supply units to the logic device.

5. The system of claim 1, wherein the throttle down information indicates that a processor of each information handling system of the plurality of information handling systems does not exceed a clock rate.

6. The system of claim 1, wherein the power consumption levels respectively associated with the plurality of information handling systems are based at least on peak power consumption levels respectively associated with the plurality of information handling systems and based at least on average power consumption levels respectively associated with the plurality of information handling systems.

7. The system of claim 1, wherein the enclosure controller is further configured to receive configuration information that includes the threshold number.

8. A method, comprising:
querying a plurality of information handling systems, housed in a chassis, for respective power consumption levels;
determining an amount of power utilized by the plurality of information handling systems from the power consumption levels respectively associated with the plurality of information handling systems;
determining an integer number of power supply units based at least on the amount of power utilized by the plurality of information handling systems;
determining that a number of operational power supply units changes;
determining that the number of operational power supply units is not at or above a threshold number;
determining when the number of operational power supply units is at or above the integer number of power supply units;
when the number of operational power supply units is at or above the integer number of power supply units, determining when a chassis bypass is enabled;
when the chassis bypass is enabled, determining that the number of operational power supply units changes; and
when the number of operational power supply units is not at or above the integer number of power supply units or when the chassis bypass is not enabled, providing throttle down information to the plurality of information handling systems.

9. The method of claim 8, further comprising:
determining chassis health status information based at least on at least one of health status information associated with a fan of the chassis, health status information associated with a non-volatile memory medium of the chassis, and health status information associated with a power supply node of the chassis;
providing the chassis health status information to a logic device of the chassis; and
the logic device configuring the chassis bypass to be enabled or to be not enabled based at least on the chassis health status information;
wherein the determining when the chassis bypass is enabled includes the logic device determining when the chassis bypass is enabled.

10. The method of claim 8, further comprising:
providing the integer number of power supply units to a logic device of the chassis;
wherein the determining when the number of operational power supply units is at or above the integer number of power supply units includes the logic device determining when the number of operational power supply units is at or above the integer number of power supply units; and
wherein the determining that the number of operational power supply units changes includes the logic device determining that the number of operational power supply units changes.

11. The method of claim 10, further comprising:
periodically performing:
the querying the plurality of information handling systems housed in the chassis for the respective power consumption levels;
the determining the amount of power utilized by the plurality of information handling systems from the power consumption levels respectively associated with the plurality of information handling systems;
the determining the integer number of power supply units based at least on the amount of power utilized by the plurality of information handling systems; and
the providing the integer number of power supply units to the logic device of the chassis.

12. The method of claim 8, wherein the throttle down information indicates that a processor of each information handling system of the plurality of information handling systems does not exceed a clock rate.

13. The method of claim 8, wherein the power consumption levels respectively associated with the plurality of information handling systems are based at least on peak power consumption levels respectively associated with the plurality of information handling systems and based at least on average power consumption levels respectively associated with the plurality of information handling systems.

14. The method of claim 8, further comprising:
receiving configuration information that includes the threshold number.

15. An enclosure controller, configured to:
query a plurality of information handling systems, housed in a chassis, for respective power consumption levels;
determine an amount of power utilized by the plurality of information handling systems from the power consumption levels respectively associated with the plurality of information handling systems;
determine an integer number of power supply units based at least on the amount of power utilized by the plurality of information handling systems;
determine that a number of operational power supply units changes;
determine that the number of operational power supply units is not at or above a threshold number;

determine when the number of operational power supply units is at or above the integer number of power supply units;

when the number of operational power supply units is at or above the integer number of power supply units, determine when a chassis bypass is enabled;

when the chassis bypass is enabled, determine that the number of operational power supply units changes; and when the number of operational power supply units is not at or above the integer number of power supply units or when the chassis bypass is not enabled, provide throttle down information to the plurality of information handling systems.

16. The enclosure controller of claim 15, wherein the enclosure controller includes a logic device;

wherein the enclosure controller is further configured to:
   determine chassis health status information based at least on at least one of health status information associated with a fan of the chassis, health status information associated with a non-volatile memory medium of the chassis, and health status information associated with a power supply node of the chassis; and
   provide the chassis health status information to the logic device;

wherein the logic device is configured to configure the chassis bypass to be enabled or to be not enabled based at least the chassis health status information; and wherein, to determine when the chassis bypass is enabled, the logic device is configured to determine when the chassis bypass is enabled.

17. The enclosure controller of claim 15, wherein the enclosure controller includes a logic device;

wherein the enclosure controller is further configured to provide the integer number of power supply units to the logic device;

wherein, to determine when the number of operational power supply units is at or above the integer number of power supply units, the logic device is configured to determine when the number of operational power supply units is at or above the integer number of power supply units; and wherein, to determine that the number of operational power supply units changes, the logic device is configured to determine that the number of operational power supply units changes.

18. The enclosure controller of claim 17, wherein the enclosure controller is further configured to periodically:
   query the plurality of information handling systems housed in the chassis for the respective power consumption levels;
   determine the amount of power utilized by the plurality of information handling systems from the power consumption levels respectively associated with the plurality of information handling systems;
   determine the integer number of power supply units based at least on the amount of power utilized by the plurality of information handling systems; and
   provide the integer number of power supply units to the logic device.

19. The enclosure controller of claim 15, wherein the throttle down information indicates that a processor of each information handling system of the plurality of information handling systems does not exceed a clock rate.

20. The enclosure controller of claim 15, wherein the power consumption levels respectively associated with the plurality of information handling systems are based at least on peak power consumption levels respectively associated with the plurality of information handling systems and based at least on average power consumption levels respectively associated with the plurality of information handling systems.

* * * * *